UNITED STATES PATENT OFFICE.

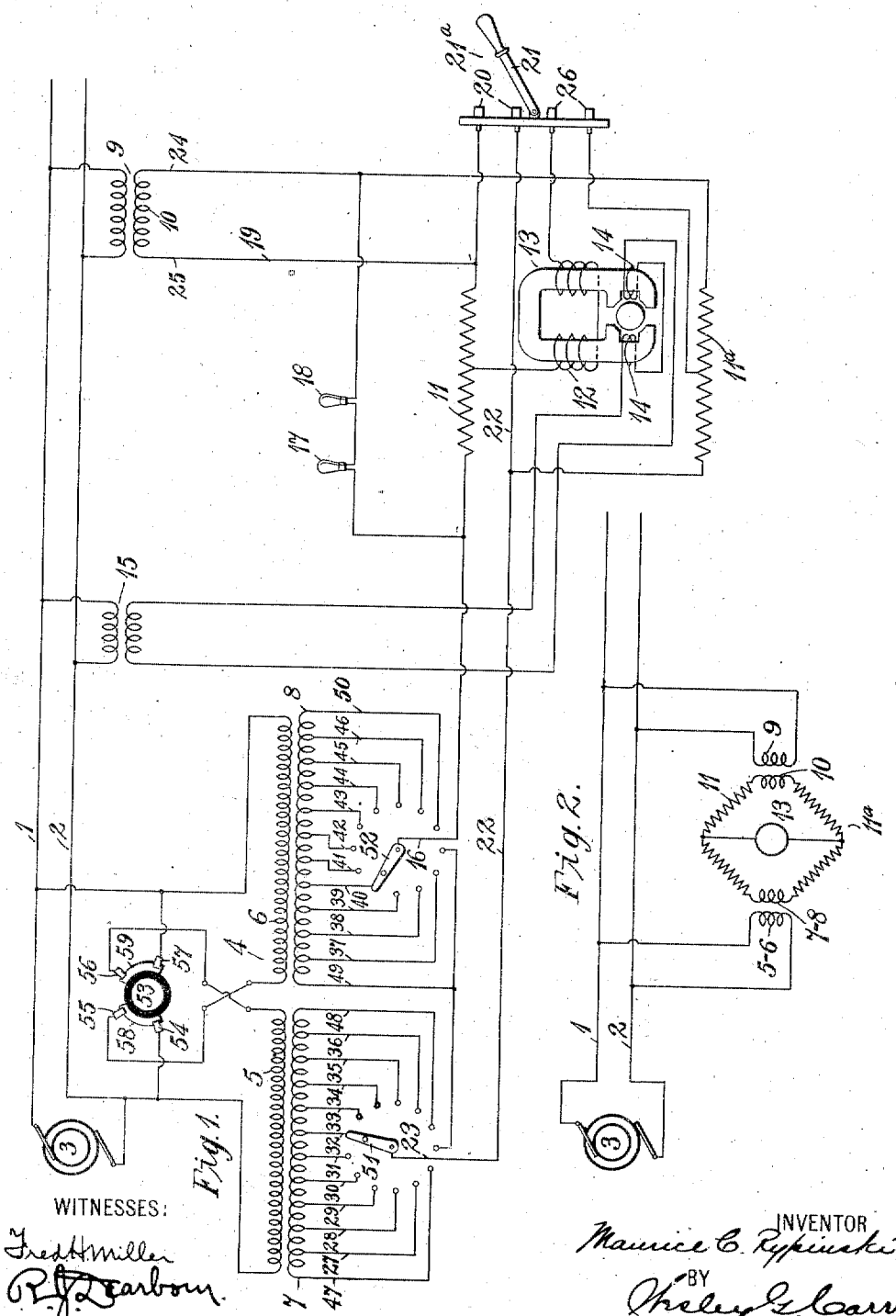

MAURICE C. RYPINSKI, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

METHOD OF TESTING ELECTRIC TRANSFORMERS.

984,160.     Specification of Letters Patent.     Patented Feb. 14, 1911.

Application filed December 6, 1907. Serial No. 405,440.

*To all whom it may concern:*

Be it known that I, MAURICE C. RYPINSKI, a citizen of the United States, and a resident of Pittsburg, in the county of Allegheny and State of Pennsylvania, have invented a new and useful Improvement in Methods of Testing Electric Transformers, of which the following is a specification.

My invention relates to methods of testing electrical apparatus, and it has for its object to provide an improved method of testing the polarity and ratio of transformation of transformers.

Figure 1 of the accompanying drawings is a diagrammatic view showing the circuit connections of a system for practicing my invention, and Fig. 2 is a similar view in which the resistances are so illustrated as to set forth more clearly their relation to the rest of the system.

Referring to the drawings, electrical energy is supplied to a substantially constant potential line 1—2 from any suitable alternating current source, such as a single-phase generator 3. A standard testing transformer 4, having primary windings 5 and 6 and secondary windings 7 and 8, is supplied with energy from the line 1—2, across which it is connected in multiple circuit with a transformer 9, which is to be tested in order to determine its polarity and the relation of its primary to its secondary windings.

The secondary winding 10 of the transformer 9 and the secondary windings 7 and 8 of the standard transformer are connected to each other, as clearly shown in Fig. 2, through two equal resistances 11 and 11ª, the secondary windings 7 and 8 being illustrated as a single winding in this diagram, although they may be connected either in series or in multiple circuit, as hereinafter pointed out.

The middle points of the resistances 11 and 11ª are joined through a winding 12 of a measuring instrument 13, a second winding 14 of which is constantly energized from any suitable source, such as a transformer 15. The instrument 13 is so designed and is provided with the windings 12 and 14 such that its moving element tends to move in one direction or the other according to the phase relations of the electromotive forces impressed upon the windings. Consequently, a phase reversal is clearly indicated by a reverse deflection. Another secondary circuit is completed from one terminal 16 of the testing transformer through indicating lamps 17 and 18, winding 10 of the transformer 9, conductor 19, terminals 20 and arm 21 of a double-throw switch 21ª and conductor 22 to the other terminal 23 of the testing transformer.

In testing the transformer 9, it is first desirable to determine the polarity of its winding which may be accomplished by so throwing the switch arm 21 as to bridge contact members 20. When this is done, circuit connections are established from terminal 16 of the testing transformer through indicating lamps 17 and 18 to terminal 24 of the transformer 9, and from terminal 23 of the testing transformer through conductor 22, contacts 20 of switch 21ª and conductor 19 to the terminal 25 of the transformer 9. It is evident that either a voltage equivalent to the sum of those produced by the two secondary windings or a voltage equivalent to the difference between said voltages will be impressed upon the terminals of the lamps 17 and 18. If the terminal 24 of the transformer 9 is of the same polarity as the terminal 16 of the standard transformer, the transformer secondaries will oppose each other, and the lamps 17 will either burn dimly or go out. On the other hand, if terminal 25 is of the same polarity as the terminal 16, the secondary windings will assist each other and a relatively high voltage will be impressed upon the lamps so that they will burn brilliantly.

Having thus obtained the polarity of the transformer, it remains to determine the ratios existing between its primary and secondary windings. Before this is done it is essential that the transformer secondary windings oppose each other on account of the relation between the resistances 11 and 11ª and the remainder of the system. When this condition exists, as indicated by the lamps burning dimly, energy is first supplied to the winding 12 of the measuring instrument 13 by closing its circuit through contact members 26 which are bridged by the switch arm 21 when it occupies one of its extreme positions. As soon as this is done, the movable member of the instrument will be deflected in the one direction or the other, according as the standard transformer secondary voltage is higher or lower than the secondary voltage of the transformer 9. The constant potential of the line 1—2 being known, it is now only necessary to adjust the ratio of the standard transformer until there is no deflection of the movable member of the instrument 13. In order that this adjustment may be accurately and determinately accomplished, the secondary windings 7 and 8 of the standard transformer are provided with a plurality of intermediate taps 27 to 46, inclusive, which, together with the terminals 47, 48, 49, and 50 are, severally, connected to two groups of contact members which are arranged substantially in arcs of circles and are respectively engaged by movable contact arms 51 and 52. The transformer terminals which are designated by reference characters 16 and 23 are respectively connected to these contact arms.

The primary windings 5 and 6 of the standard transformer are adapted to be thrown in series or multiple circuit relation by means of a switching device 53 which comprises stationary contact members 54, 55, 56, and 57 and movable contact members 58 and 59. By rotating the movable member through an angle of substantially 90° the circuit changes are effected in a well known manner. In this way, the standard transformer is adapted for use with a large number of transformers having widely varying ratios of transformation.

It is conceivable that variations in the circuit connections of my system may be effected without departing from the spirit of my invention, and I desire that only such limitations shall be imposed as are indicated in the appended claims.

I claim as my invention:

1. The method of testing transformers which consists in supplying energy to parallel-connected primary windings of two transformers, one of which is standard, connecting the corresponding terminals of the secondary windings of the transformers together through resistances, connecting between intermediate points in the resistances an indicating instrument that is sensitive to phase reversals, and adjusting the voltage impressed on the resistances by the standard transformer.

2. The method of testing transformers which consists in supplying energy to the primary windings of two transformers connected in multiple circuit, one of said transformers having an adjustable secondary winding and a known polarity and ratio of transformation, connecting the secondary transformer windings together through equal resistances, joining the middle points of the resistances through means for indicating a balanced condition between the transformer voltages and adjusting the secondary of the transformer having the known ratio until said balanced condition is indicated.

3. The method of testing a transformer which consists in supplying current to its primary windings and to the primary winding of a standard transformer connected in parallel therewith, supplying current to a voltage-indicating device from the secondary windings of said transformers when connected thereto in series, opening said series circuit, connecting corresponding terminals of the secondary windings together through equal resistances and connecting the intermediate points in the resistance through a phase reversal indicator.

4. The method of testing a transformer which consists in supplying current to its primary winding and to the primary winding of a standard transformer connected in multiple circuit relation thereto, adjusting the polarity of the two transformers and supplying current from both transformers, through resistances, to an indicator that is sensitive to phase reversals, and adjusting the secondary voltage of the standard transformer to balance the voltage of the transformer under test.

5. The method of testing transformers which consists in the following steps: supplying alternating current energy to corresponding windings of two transformers in multiple circuit; connecting corresponding terminals of the remaining windings together through equal resistances; introducing between the middle points of the resistances an electric indicating instrument that is sensitive to phase reversals, and adjusting the active turns of the winding of one of the transformers until the instrument indicates a balanced condition.

In testimony whereof, I have hereunto subscribed my name this 19th day of November, 1907.

MAURICE C. RYPINSKI.

Witnesses:
H. W. BROWN,
BIRNEY HINES.